United States Patent
Fahey

(10) Patent No.: US 8,177,541 B2
(45) Date of Patent: May 15, 2012

(54) GYPSUM BOARD FORMING DEVICE WITH IMPROVED SLURRY SPREAD

(75) Inventor: Michael P. Fahey, St. Petersburg, FL (US)

(73) Assignee: Certain Teed Gypsum, Inc., Tampa, FL (US)

(*) Notice: Subject to any disclaimer, the term of this patent is extended or adjusted under 35 U.S.C. 154(b) by 550 days.

(21) Appl. No.: 11/853,052

(22) Filed: Sep. 11, 2007

(65) Prior Publication Data

US 2008/0220110 A1 Sep. 11, 2008

Related U.S. Application Data

(60) Provisional application No. 60/844,129, filed on Sep. 11, 2006.

(51) Int. Cl.
*B28B 5/02* (2006.01)

(52) U.S. Cl. ........ 425/220; 425/115; 425/116; 425/122; 425/123; 425/224; 264/171.13; 264/212; 264/256; 264/261; 156/39; 156/346

(58) Field of Classification Search ............... 425/96, 425/101, 110, 115, 116, 122, 123, 130, 220, 425/224, 383, 505; 264/42, 129, 169, 171.13, 264/212, 255, 256, 261, 295, 339; 156/39, 156/40, 41, 43, 45, 216, 221, 346, 256, 280
See application file for complete search history.

(56) References Cited

U.S. PATENT DOCUMENTS

| | | | |
|---|---|---|---|
| 1,751,953 A | 3/1930 | Spengler | |
| 2,722,262 A | 11/1955 | Eaton et al. | |
| 3,373,065 A | 3/1968 | Gutzman et al. | |
| 3,944,698 A * | 3/1976 | Dierks et al. | 428/219 |
| 4,230,575 A | 10/1980 | Lizee | |
| 4,265,979 A * | 5/1981 | Baehr et al. | 428/171 |
| 4,288,263 A * | 9/1981 | Delcoigne et al. | 156/42 |
| 4,417,883 A | 11/1983 | Granger et al. | |
| 4,450,022 A * | 5/1984 | Galer | 156/42 |
| 4,476,175 A * | 10/1984 | Forry et al. | 428/170 |
| 4,488,917 A * | 12/1984 | Porter et al. | 156/39 |
| 4,630,419 A * | 12/1986 | Pilgrim | 52/309.13 |
| 4,816,091 A * | 3/1989 | Miller | 156/42 |
| 5,198,052 A * | 3/1993 | Ali | 156/45 |
| 5,221,386 A * | 6/1993 | Ensminger et al. | 156/40 |
| 5,350,554 A * | 9/1994 | Miller | 264/171.11 |
| 5,718,797 A | 2/1998 | Phillips et al. | |
| 6,001,496 A * | 12/1999 | O'Haver-Smith | 428/703 |
| 6,187,409 B1 * | 2/2001 | Mathieu | 428/70 |
| 6,190,476 B1 * | 2/2001 | Seecharan et al. | 156/39 |
| 6,475,313 B1 * | 11/2002 | Peterson et al. | 156/39 |
| 6,737,156 B2 * | 5/2004 | Koval et al. | 428/294.7 |
| 6,866,492 B2 * | 3/2005 | Hauber et al. | 425/96 |
| 6,878,321 B2 * | 4/2005 | Hauber et al. | 264/129 |
| 7,028,436 B2 * | 4/2006 | Bezubic, Jr. | 52/288.1 |
| 7,435,369 B2 * | 10/2008 | Hennis et al. | 264/129 |
| 7,470,338 B2 * | 12/2008 | Callais et al. | 156/39 |

(Continued)

*Primary Examiner* — Joseph Del Sole
*Assistant Examiner* — Seyed Masoud Malekzadeh
(74) *Attorney, Agent, or Firm* — GrayRobinson, P.A.; Michael J. Colitz, III

(57) ABSTRACT

Disclosed is a gypsum board forming device which provides improved slurry spread. The device includes a forming table with an arcuate or angled profile that promotes a uniform slurry spread. An arcuate or angled hinge plate can also be included to further promote the uniform distribution of slurry prior to an extrusion plate. As a result of the improved slurry spread, gypsum board with increased strength and durability can be created.

9 Claims, 3 Drawing Sheets

U.S. PATENT DOCUMENTS

| | | | |
|---|---|---|---|
| 2002/0095893 A1* | 7/2002 | Walters et al. | 52/309.14 |
| 2002/0187296 A1* | 12/2002 | Hauber et al. | 428/68 |
| 2002/0187297 A1* | 12/2002 | Hauber et al. | 428/70 |
| 2002/0187298 A1* | 12/2002 | Hauber et al. | 428/70 |
| 2005/0121131 A1* | 6/2005 | Hennis et al. | 156/41 |
| 2005/0159057 A1* | 7/2005 | Hauber et al. | 442/42 |

* cited by examiner

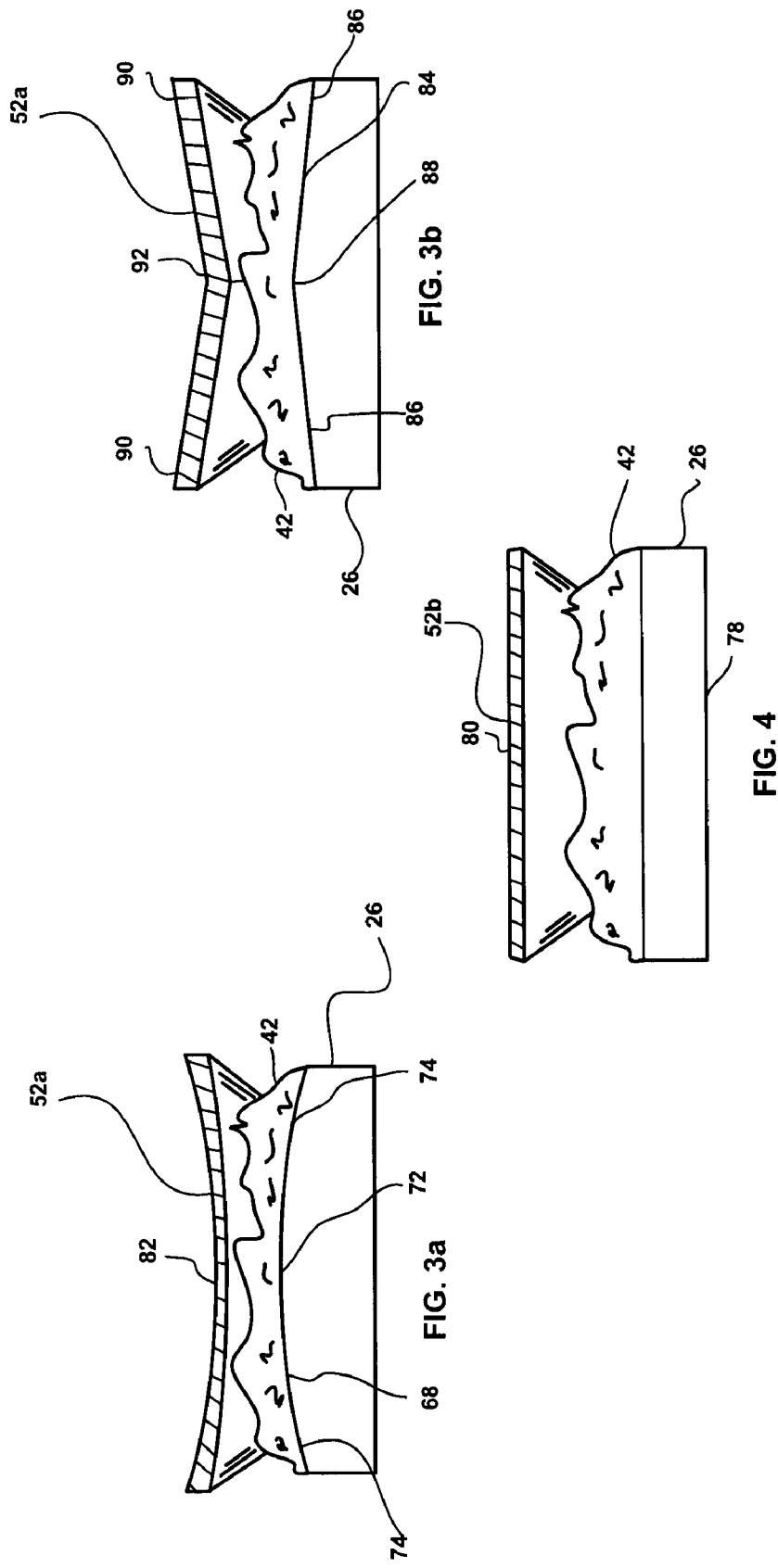

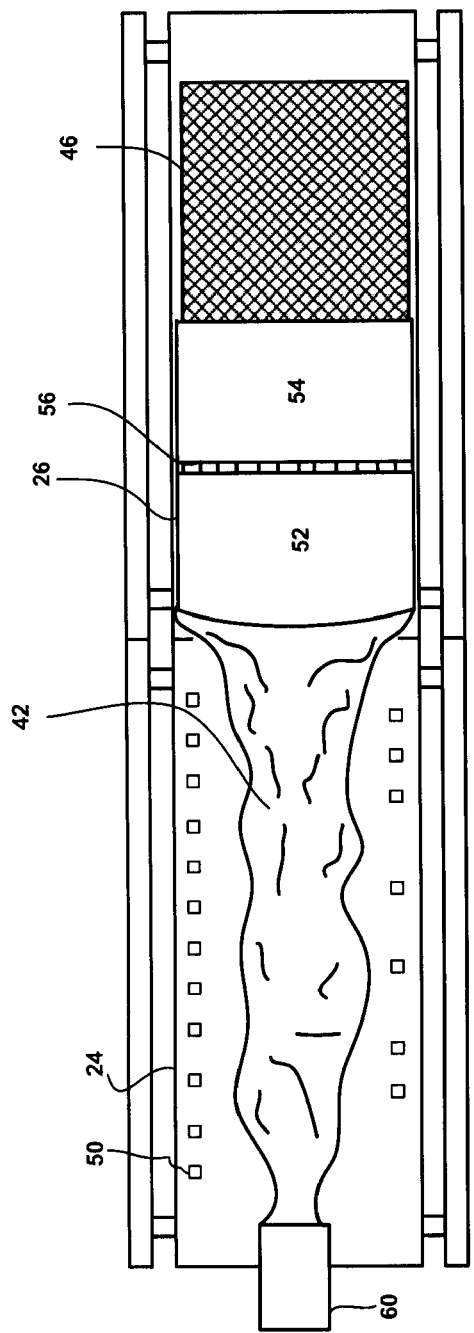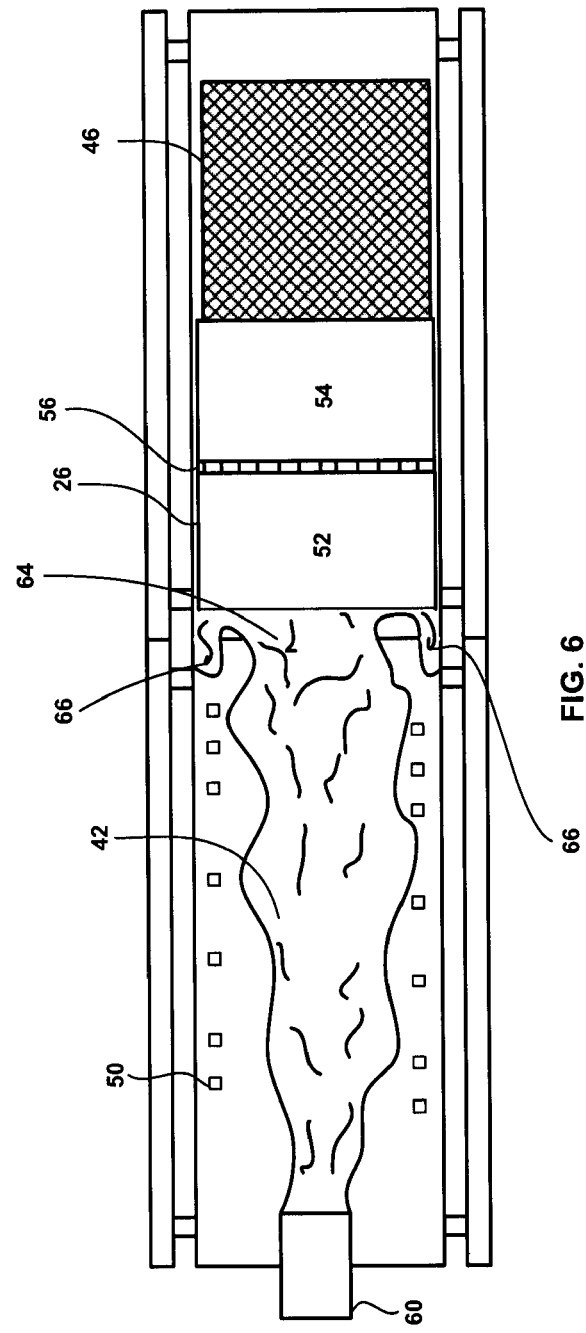
FIG. 5
FIG. 6

GYPSUM BOARD FORMING DEVICE WITH IMPROVED SLURRY SPREAD

CROSS-REFERENCE TO RELATED APPLICATIONS

This application claims priority to co-pending provisional patent application entitled A Method of Improving Slurry Spread Prior to the Extruder Pinch Point filed on Sep. 11, 2006 under application Ser. No. 60/844,129. The contents of this co-pending application are incorporated herein by reference.

BACKGROUND OF THE INVENTION

1. Field of the Invention

This invention relates to a system for improving slurry spread. More specifically, the present invention relates to a forming table with an arcuate or angled cross section that improves the distribution of slurry in the area immediately prior to the pinch point.

2. Description of the Background Art

The prior art contains several examples of gypsum board forming devices. These devices employ various mechanisms for ensuring the shape and quality of the resulting board. For example, U.S. Pat. No. 2,722,262 to Eaton discloses an apparatus for the continuous production of a paper encased gypsum plaster strip. The apparatus includes a table over which a continuous strip is passed. The apparatus further includes a block and side guide members for shaping the strip and associated gypsum.

Additionally, U.S. Pat. No. 3,373,065 to Gutzman discloses a gypsum board forming machine. Support guides on the bed of the machine raise the edge portions of the bottom cover sheet to form a trough. Due to the depth of the trough, the head of the slurry which accumulates at the entrance to a board forming passageway is laterally confined.

U.S. Pat. No. 1,751,953 to Spengler discloses a plaster board manufacturing apparatus. The apparatus includes a conveyor onto which a plastic material is deposited. Damming bars are provided to prevent the plastic material from flowing from the applied sheet or from banking too near the edge thereof.

Finally, U.S. Pat. No. 5,718,797 to Phillips et. al. discloses an apparatus for manufacturing gypsum board. The apparatus includes a conveyor and a duct for dispensing gypsum slurry. The slurry flows and spreads out across an underlying sheet. Folding shoes are included at the borders for folding the borders upwardly.

Although the above referenced inventions achieve their individual objectives, all suffer from common drawbacks. Namely, none of the referenced inventions is directed at promoting the uniform distribution of slurry adjacent a pinch point.

SUMMARY OF THE INVENTION

It is therefore one of the objectives of this invention to provide a gypsum board forming device that promotes the uniform distribution of slurry adjacent a pinch point.

It is yet another objective of this invention to provide a gypsum board forming device the promotes the spread of slurry to the edges of an associated forming table.

It is another objective of this invention to provide a gypsum board forming device that produces boards without voids and that have an improved strength and durability.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3a is a cross sectional view taken along line 3-3 of FIG. 1.

FIG. 3b is a cross sectional view of an alternative embodiment taken along line 3-3 of FIG. 1.

FIG. 4 is a cross sectional view taken along line 4-4 of FIG. 1.

FIG. 5 is a plan view taken along line 5-5 of FIG. 1.

FIG. 6 is a plan view of a flat forming table.

Similar reference characters refer to similar parts throughout the several views of the drawings.

DETAILED DESCRIPTION OF THE PREFERRED EMBODIMENT

The present invention relates to a gypsum board forming device which provides improved slurry spread. The device includes a forming table with an arcuate or angled profile that promotes a uniform distribution of slurry. The shape can be used in conjunction with conventional agitators that are likewise used to promote slurry spread. An arcuate or angled hinge plate can also be included to further promote the uniform distribution of slurry prior to an extrusion plate. As a result of the improved slurry distribution, boards with increased strength and durability can be created. The various details of the present invention, and the manner in which they interrelate, will be described in greater detail hereinafter.

Figure 1:
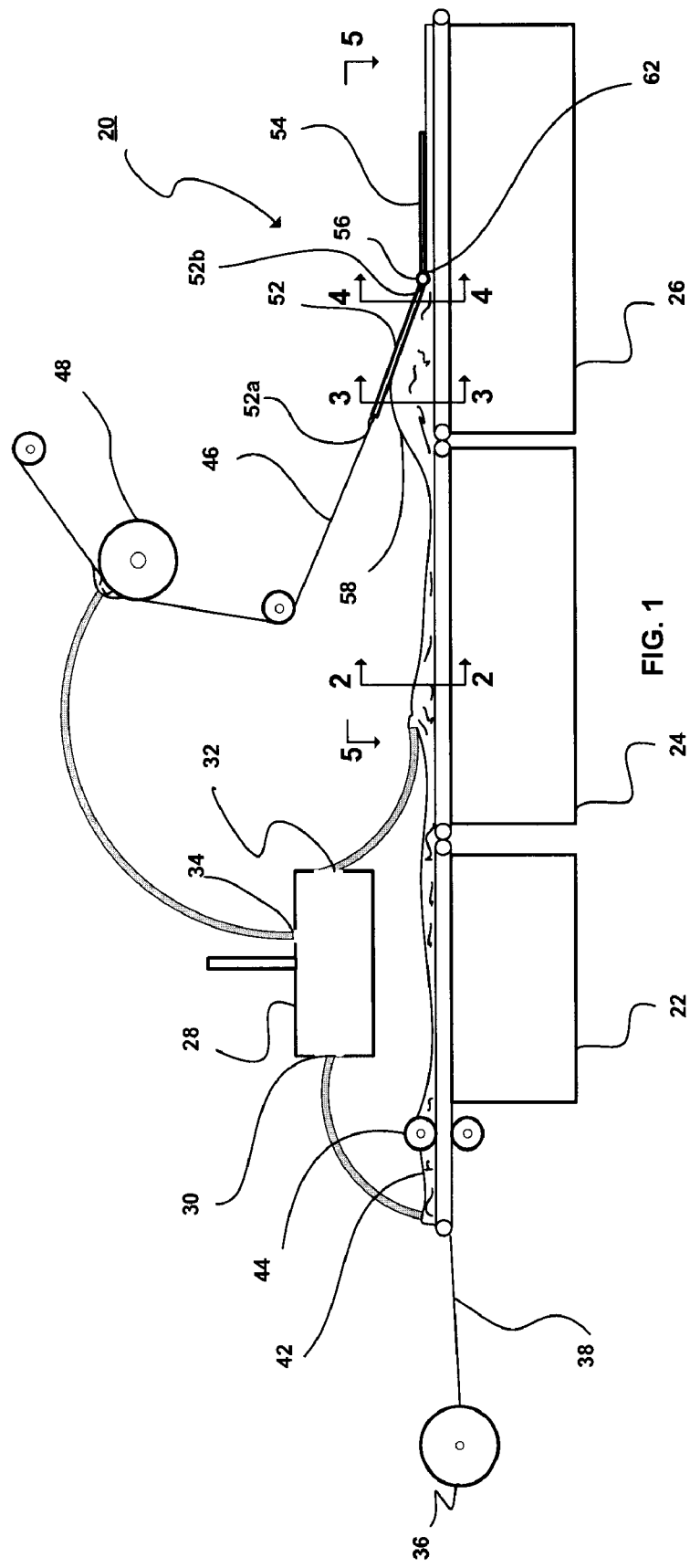
FIG. 1 is a schematic view of a gypsum board forming device.

With reference now to FIG. 1, the gypsum board forming device 20 of the present invention is depicted. Device 20 preferably includes three forming tables (22, 24 and 26) arranged in end to end fashion. Nonetheless, those skilled in the art will appreciate that any number of board forming tables can be employed in conjunction with the present invention. As is known, the tables can include vibrators or agitators 50 (note FIG. 5) that promote the uniform distribution of slurry.

A gypsum slurry 42 is supplied to the forming tables from a continuous mixer 28 via one or more boots 60. Mixer 28 accepts the raw materials used to produce gypsum (i.e. stucco, plaster, gypsum, water and other additives) and produces a slurry mixture suitable for use in making gypsum board. The specific mixer 28 depicted includes three outlets (30, 32 and 34), although any number of outlets can be employed depending upon the nature of the boards being produced. Separate mixing chambers can be included within mixer 28 for the purpose of providing slurry with varying consistency at the respective outlets. For example, slurry 42 provided to the facing sheets of the board may be more dense than the slurry constituting the core of the board.

With continuing reference to FIG. 1, the lower supply roll 36 of the device 20 is illustrated. This lower supply roll 36 spools out a bottom facing sheet 38 to the upper surface of the first forming table 22. As is known in the art, this bottom facing sheet 38 can take the form of a fiberglass mat or a paper sheet. The composition and size of the sheet can be varied and will depend upon the intended use of the boards being produced.

After the facing sheet 38 is laid out on the forming table 22, slurry 42 from mixer 28 is dispensed over top of sheet 38 by way of the first slurry outlet 30. Thereafter, a roll coater 44 is used to spread the gypsum slurry 42 over bottom facing sheet 38. Roll coater 44 preferably supplies a sufficient amount of pressure to ensure that the slurry penetrates the fibers of the mat, or is otherwise coated to the paper, so as to create a permanent bond. The speed of the rollers and the applied pressure can be adjusted to achieve optimal distribution and penetration. As is known in the art, a tensioning roller can be positioned immediately below the roller coater 44.

FIG. 1 illustrates that additional slurry 42 is dispensed over the facing sheet 38 along a second forming table 24 and via the second slurry outlet 32. This additional slurry 42 forms the core of the resulting gypsum board product. Thus, the amount of slurry supplied by the second slurry outlet 32 will depend upon the intended use of the gypsum board being created.

A top facing sheet 46 is thereafter supplied from an upper supply roll 48. As noted in FIG. 1, additional slurry from outlet 34 can be supplied to the lower surface of this top facing sheet 46. The slurry supplied to this facing sheet is preferably more dense than the slurry used to form the core. Sheet 46 can consist of the same construction used for the lower facing sheet 38. In a manner known in the art, the upper sheet 46 is thereafter delivered overtop of the gypsum slurry 42 to form a composite board construction.

As illustrated in FIG. 1, this upper sheet 46 is preferably delivered to the process via an extruder assembly. The extruder assembly includes both a hinge plate 52 and an extruder plate 54. These plates (52 and 54) are pivotally interconnected to one another along a hinge 56 and are generally oriented at a distance above the bottom plate of the extruder assembly.

Hinge 56 allows the two plates (52 and 54) to pivot with respect to each other. In normal operation, slurry accumulates in a head 58 adjacent to the hinge plate 52. Slurry head 58, in turn, causes the hinge plate 52 to pivot upwardly relative to the horizontal. By contrast, once slurry 42 reaches the extruder plate 54 it is generally smoothed out and has attained a thickness that generally matches the desired board thickness. Accordingly, as the hinge plate 52 forces the slurry head 58 into extruder plate 54, a pinch point 62 is created.

Pinch point 62 may have the undesirable tendency of creating a non-uniform profile in the slurry 42 as it approaches the extruder plate 54. This non-uniform profile 64 is illustrated in FIG. 6. One characteristic of this profile is that eddie currents 66 are formed in the areas adjacent the edges of the forming table 26. The non-uniform slurry 64 distribution has many undesirable consequences. For instance, the resulting gypsum board often includes voids and density variations that yield boards of reduced strength.

Figure 2B:
FIG. 2b is a cross sectional view of an alternative embodiment taken along line 2-2 of FIG. 1.
Figure 2A:
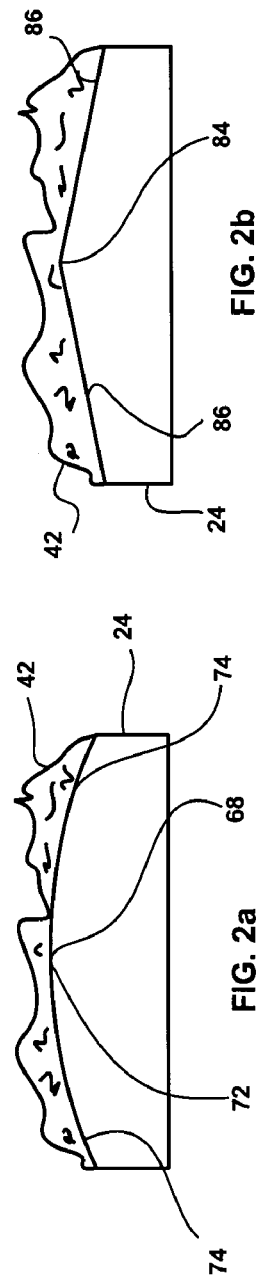
FIG. 2a is a cross sectional view taken along line 2-2 of FIG. 1.

In accordance with the present invention, a uniform distribution of slurry is promoted by providing an arcuate cross section 68 along the second and third forming tables (24 and 26). More specifically, as noted in FIG. 2a, table 24 includes a raised central area 72 and lower side regions 74 in the area immediately adjacent the second outlet 32 of mixer 28. The profile transitions from the arcuate profile along the second forming table 24 (note FIG. 2a), to a slightly less arcuate profile along the third forming table 26 (note FIG. 3a), and finally to a planar profile 78 immediately adjacent the extruder plate 54 (note FIG. 4). This continuous transition ensures an adequate distribution of slurry at the slurry head 58, but at the same time ensures that a flat board is produced within extruder plate 54.

Although the preferred embodiment is described in conjunction with arcuate profiles (note FIGS. 2a and 3a), the present invention can also be carried out with other shapes. For example, forming tables with an angled profile (note FIGS. 2b and 3b) and likewise be used to promote slurry distribution. Namely, the tables would include a raised center portion 88 with downwardly sloped sides 86. The preferred embodiment would likewise be tapered from the second to the third tables (24 and 26). In other words, the angle formed along the second table 24 (FIG. 2b) would be greater than angle along the third table 26 (FIG. 3b). This transition would be continuous with a planer cross section 78 being achieved immediately before the extruder plate 54 (FIG. 4).

Still yet further slurry distribution can be achieved via an arcuate or angled hinge plate 52. Namely, the distal end 52a of hinge plate 52 can be curved upwardly 82 with respect to the third forming table 26 (note FIG. 3a). Namely, the curvature 82 of the distal end 52a of plate 52 would be opposite the curvature 68 of the underlying table 26. As noted in FIG. 3a, this has the tendency of forcing the slurry 42 between plate 52 and table 26 to the outer edges of the table, thereby promoting a more uniform distribution. This construction, in turn, eliminates the eddies 66 that would otherwise form between two planar profiles.

Although extruder plate 52 has been described with an arcuate cross section 82, an angled cross section 92 can also be used at the distal end 52a of hinge plate 52 (note FIG. 3b). Again, the preferred angle is opposite the angle of the underlying table 26. In other words, whereas the sides 86 of table 26 are angled downwardly, the sides 90 of the distal end 52a of hinge plate 52 are upwardly angled. Consequently, slurry 42 is pushed outwardly in a manner akin to water passing over a ships bow.

Whatever shape is used for the distal end 52a of hinge plate 52, the proximal end 52b adjacent pinch point 62 is planar 80 (note FIG. 4). Again, there is preferably a uniform transition between the distal and proximal ends (52a and 52b). This planar cross section 80 of the proximal end 52b is illustrated in FIG. 4 an ensures that the top sheet 46 is evenly applied to the underlying slurry 42.

In still yet further embodiments of the present invention, the shape of the distal end 52a of hinge plate 52 can be changed. In one embodiment, this is achieve by forming hinge plate 52 from an expansible bladder than can be inflated or deflated as necessary to change the shape and/or curvature of the plate. In still yet another embodiment, the angled hinge plate 92 includes a hinge intermediate sides 90 which allows the angle formed to be adjusted as needed.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A gypsum board forming device for facilitating slurry spread prior to a pinch point, the device comprising:
   a gypsum slurry mixing device including first and second slurry outlets;
   a first forming table having an upper surface;
   a lower supply roll supplying a bottom facing sheet to the upper surface of the first forming table, the first slurry outlet supplying slurry over the bottom facing sheet;
   a roll coater positioned along the first forming table and functioning to spread the gypsum slurry over the bottom facing sheet;
   a second forming table, the second forming table having side edges, a central area, and a first arcuate cross section, the first arcuate cross section defined by a raised central area and lower side edges, the second slurry outlet supplying additional slurry to the bottom facing sheet along the second forming table, the first arcuate cross section promoting the distribution of slurry;
   a third forming table having an upper surface, side edges, and a second arcuate cross section defined by a raised central area and lower side edges, the first arcuate cross section being greater than the second arcuate cross section;
   an upper supply roll supplying a top facing sheet to the third forming table;
   a hinge plate and an extruder plate pivotally interconnected at the pinch point along the third forming table, the hinge plate and the extruder plate each having a proximal end, a distal end, and a longitudinal axis, the distal end of the hinge plate having a third arcuate cross section, the third arcuate cross section being opposite to the second arcuate cross section, the hinge plate being positioned at an angle relative to the third forming table, the third arcuate cross section functioning to create a slurry head prior to the pinch point, wherein the second arcuate cross section of the third forming table and the third arcuate cross section of the hinge plate causes the slurry to flow to the side edges and thereby facilitate distribution of slurry prior to the pinch point.

2. A board forming device to facilitate slurry spread comprising:
   a supply of slurry with an outlet;
   a forming table with a longitudinal axis, the forming table being curved about the longitudinal axis, the outlet supplying slurry to the forming table, the curve functioning to distribute the slurry;
   a hinge plate and an extruder plate pivotally interconnected to one another, the hinge plate and the extruder plate each having a proximal end, a distal end, and a longitudinal axis, the distal end of the hinge plate being curved about the longitudinal axis, wherein the curvature of the hinge plate is opposite to the curvature of the forming table, a slurry head formed adjacent the hinge plate, wherein the curve of the table and hinge plate function in promoting the distribution of slurry prior to the extruder plate.

3. The board forming device as described in claim 2 wherein the hinge plate is formed from an expansible bladder.

4. The board forming device as described in claim 2 wherein the curvature of the table gradually decreases from a location adjacent the slurry outlet to a location adjacent the extruder plate.

5. The board forming device as described in claim 2 wherein the curvature of the hinge plate decreases from the distal to the proximal end.

6. A board forming device to facilitate slurry spread comprising:
   a supply of slurry with an outlet;
   a forming table with a longitudinal axis, the forming table being angled about the longitudinal axis, the outlet supplying slurry to the forming table, the angled profile functioning to distribute the slurry;
   a hinge plate and an extruder plate pivotally interconnected to one another, the hinge plate and the extruder plate each having a proximal end, a distal end, and a longitudinal axis, the distal end of the hinge plate being angled about the longitudinal axis, wherein the angle of the forming table is opposite of the angle of the hinge plate, a slurry head formed adjacent the hinge plate, wherein the angled profiles of the table and hinge plate function in promoting the distribution of slurry prior to the extruder plate.

7. The board forming device as described in claim 6 wherein the hinge plate is pivotal along its longitudinal axis.

8. The board forming device as described in claim 6 wherein the angled profile of the table gradually decreases from a location adjacent the slurry outlet to a location adjacent the extruder plate.

9. The board forming device as described in claim 6 wherein the angled profile of the hinge plate decreases from the distal to the proximal end.

* * * * *